Inventor
Albert J. Barthelmes
By Mueller & Mason
Attorneys

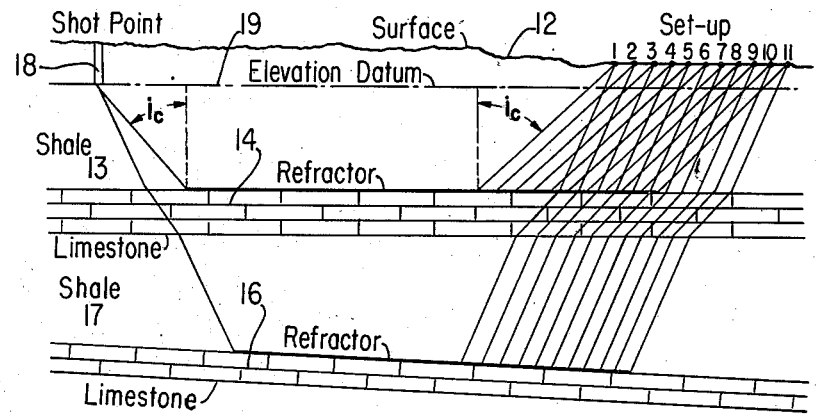

Patented May 13, 1952

2,596,463

UNITED STATES PATENT OFFICE 2,596,463

METHOD FOR DETERMINING SUBSURFACE GEOLOGICAL STRUCTURE BY SEISMIC SURVEYING EMPLOYING REFRACTION SHOOTING

Albert J. Barthelmes, Tulsa, Okla., assignor, by mesne assignments, to Seismograph Service Corporation, Tulsa, Okla., a corporation of Delaware Application May 8, 1946, Serial No. 668,294

1 Claim. (Cl. 181—0.5)

The present invention relates to seismic surveying and more particularly to a method for determining subsurface geological structure by seismic surveying employing refraction shooting.

Seismic surveying or seismic geophysical prospecting has been extensively used for about twenty-five years. Essentially seismic prospecting comprises creating seismic waves near the surface of the earth as for example by detonating explosive material and recording the reception of waves which have been transmitted through the earth from the generating point of the waves to detectors suitably spaced at predetermined distances from the generating point. Seismic prospecting can be divided into two different methods—the refraction method and the reflection method. The refraction method was used for all early seismic prospecting and depends upon the refraction back to the surface of waves that have penetrated to some distance below the surface. The distances between the wave generating point and the detectors are relatively large. The reflection method, on the other hand, depends upon the recognition of waves that are reflected more or less vertically to detectors at relatively short distances from the point of generation of the waves and that arrive considerably later than the first disturbances received at the detector.

The refraction method of shooting has heretofore been generally applied to seismic surveying which was concerned with reconnaissance or preliminary surveys since large areas could be covered in a relatively short time. This method of prospecting proved very successful whenever favorable subsurface conditions were encountered. It was used extensively in the salt dome areas along the Gulf Coast where high velocity salt deposits presented a sharp contrast with the surrounding relatively young formations consisting of low velocity materials. Also, by means of a correlation method of refraction shooting in areas where high velocity basement rocks were overlain by younger formations with relatively low velocities, it was possible to furnish a general outline of the attitude of the basement or subsurface layer or stratum with reasonable accuracy. In order to obtain a detailed survey of the subsurface area, however, it was heretofore found necessary to employ the reflection method of prospecting which was generally regarded as the more accurate. In fact, since the advent of the reflection method of seismic prospecting, it has almost completely replaced the refraction method.

There are, however, numerous areas where the subsurface conditions are rather complex so that the refraction correlation method of seismic prospecting was unsatisfactory and a more complete and detailed plot of the subsurface was required. If such areas in addition included heavy surface layers of rock through which reflection energy could not be transmitted, or in cases where the interface of the reflector surface was very irregular so that reliable reflection waves could not be obtained, there has been prior to the present invention no reliable method of detailing such geophysical structures. There are, for example, large areas of the Edwards plateau in West Texas where a heavy layer of Edwards limestone is encountered at the surface and where reflections when employing seismic prospecting methods have not been observed. Accordingly, it would be desirable to provide a seismic prospecting method which could be reliably used in areas where the reflection method of prospecting is unsatisfactory for either of the reasons given above and yet wherein a detailed profile of the subsurface geological structure is desired.

It is an object of the present invention to provide a new and improved method of seismic prospecting.

It is another object of the present invention to provide a refraction method of seismic prospecting which will furnish individual depth determinations for all geophone locations and will allow mapping of subsurface structures continuously in the form of large traverses not only for reconnaissance surveys but for any extent of detailing required.

It is another object of the present invention to provide a continuous profiling refraction seismic prospecting method.

It is a further object of the present invention to provide a refraction seismic prospecting method for continuously profiling a subsurface stratum, particularly in areas where reflections cannot be obtained which can be used both for reconnaissance and detailing and which is sufficiently accurate and also is economical with regard to production and cost.

Further objects and advantages of the present invention will become apparent as the following description proceeds and the features of novelty which characterize the present invention will be pointed out with particularity in the claim annexed to and forming a part of this specification.

For a better understanding of the present invention, reference may be had to the accompanying drawings in which:

Fig. 1 is a diagram of a typical geological cross-section illustrating the refraction method of seismic prospecting;

Fig. 2 is a diagrammatic representation of a geological cross-section for an idealized situation employing the continuous profiling refraction method of seismic prospecting of the present invention;

Figs. 4b, 4c and 4d are graphs for showing the steps in the process of obtaining a subsurface profile from the information obtained with the set-ups of Fig. 4a.

Figure 3:
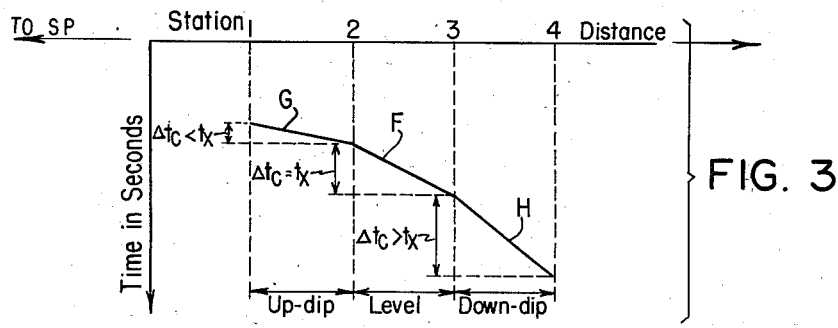
Fig. 3 is a trace analysis curve for a particular subsurface structure to aid in understanding the present invention.

The continuous profiling refraction method of seismic prospecting of the present invention employs the refraction procedure generally known as "in line shooting." The general principles of refraction in line shooting have been discussed in many geophysical publications and its fundamental outline is shown in Fig. 1 of the drawings. Referring now to Fig. 1 of the drawings, there is illustrated a cross-section of a geological structure in which the surface of the earth is designated as 12 beneath which is a layer of shale or low velocity material generally designated as 13. A higher velocity layer 14 of limestone or the like provides a first refractor. For the purpose of disclosing the present invention, it is necessary to consider only one rock layer or refractor, but it should be understood that in geological structures there may be numerous spaced layers of rock between which may be layers of lower velocity material. As illustrated in Fig. 1, a second layer of high velocity material such as limestone or other rock is indicated at 16 which is separated from the layer 14 by a lower velocity layer 17 of shale or the like. Fig. 1 also shows a plurality of detectors positioned along the surface of the ground and spaced from each other by equal distances. These detectors are designated by the numerals 1 to 11, inclusive, in Fig. 1 of the drawings and this group of detectors is generally referred to as a set-up. Although eleven detectors are shown, it should be understood that for a particular spread, many more than eleven detectors may be employed. The detectors are set up in a line with respect to a point of generation of seismic waves which is illustrated in Fig. 1 of the drawings as the "shot point 18" and hence the expression "in line shooting." The reason that this point 18 is referred to as a shot point is because one common method of creating seismic waves is by detonating an explosive either at the surface or beneath the surface of the earth. It will be understood that the seismic waves created at the shot point 18 travel outward in all directions from the source and undergo reflection and refraction at the interface between any two layers of subsurface structure having different physical properties. If the subsurface structure contains one or more layers of rock such as 14 and 16 in Fig. 1 of the drawings which transmit seismic waves at relatively high speeds compared to the transmission of these waves in material such as the shale indicated as 13 and 17 in Fig. 1 of the drawings, there will be waves incident to such high speed layers at angles $i_c$ generally referred to as the critical angle. By this is meant that such waves will be refracted so as to travel along the surface of the interface between these layers and then again refracted at angles equal to the critical angle $i_c$ to the surface of the ground. Specifically, the term "critical angle" as used herein and as generally understood by those skilled in the art means the angle beyond which waves generated at the shot point cannot be reflected back to the earth's surface, but can only so return by refraction. Thus it will be understood that the distance between the shot point 18 and the detector spread is substantially greater than the distance from the shot point 18 at which waves generated at the shot point and reflected from either the subterranean bed 14 or the bed 16 can be detected at the earth's surface. The trajectory of the refracted waves is generally of trapezoidal form in that they travel from the shot point station 18 to the interface between the layers 13 and 14 or the interface between the layers 16 and 17 and then along these interfaces for a predetermined distance and then from these interfaces at the same predetermined angle to the points on the surface some distance away from the shot point station. The critical angle $i_c$ for different interfaces is determined by the known characteristics of the material through which the refracted waves are transmitted and also varies somewhat if the refractor layers are different. Such trapezoidal wave trajectories for each of the refractors 14 and 16 of Fig. 1 are clearly shown thereon.

In beginning a seismic survey employing the refraction method of the present invention, it is first necessary to determine the distance that a refracted wave will reliably carry and it is also necessary to determine how far from the shot point it is necessary for the detectors to be positioned so that desired refracted waves will be received. If the rock layer or refractor 14 for example has a thickness which is relatively small compared to the distance of travel of the waves along this refractor, dissipation of the wave energy occurs, thereby limiting the distance between the shot point station and the spread of detectors. On the other hand, if the thickness of the refractor is relatively great, travel of the wave along the refractor for great distances may be obtained and the spread of the detectors may be relatively large, necessitating a great many more than the eleven detectors shown in Fig. 1 of the drawings to obtain all the desired information. In refraction shooting methods employed today, it has been observed that the length of the spread which will return refracted waves from the same refractor, may vary widely in different areas. Assuming that waves in a certain area can be observed along a spread of the order of 10,000 feet, and with the detectors spaced a distance of 250 feet apart, for example, it will be obvious that as many as forty-one detectors might be required for getting all the information for a spread. Recording devices usually do not have means for recording forty-one separate traces and as a result it may be necessary to fire more than one shot at the shot point station with several set-ups such as the eleven detector set-up shown in Fig. 1 of the drawings in order to record the desired information for a forty-one detector spread.

After the length of the spread and the most advantageous shooting distances have been determined by preliminary methods which are well understood by those skilled in the art, the continuous profile refraction method of seismic prospecting of the present invention may be employed. Before discussing that, however, it will be understood that in all seismic prospecting methods, certain corrections and assumptions are necessary. It has been found in seismic prospecting that there is nearly always a weathered or surface layer which has a distinctly lower seismic wave speed than the material immediately underlying it. Corrections must be made for this weathered layer. In addition it is customary to make an elevation correction so that calculations may be made on the assumption that the shot point and the detectors are all on a datum plane or elevation datum positioned at an arbitrary elevation referred to sea level. The datum plane is shown at 19 in Fig. 1 of the drawings. Thus the actual travel time for the wave trajectories shown in Fig. 1 of the drawings from the shot point to the various detectors 1 to 11, respectively, would be corrected to a theoretical travel time which would be observed if the shot point and the recording stations were located at the level of the elevation datum 19. The methods of making these corrections will be understood by those skilled in the art and form no part of the present invention.

As has been brought out in the preceding paragraph, the results obtained by the refraction method of seismic prospecting have a weathering and elevation correction applied thereto so as to effectively position the generating point of the seismic wave and the recording stations on a datum plane. The present invention has been illustrated in Fig. 2 for an idealized set-up where the datum plane is considered to be the surface of the ground and furthermore, where the refractor is parallel with the datum plane. Referring now to Fig. 2 of the drawings, there is illustrated the datum plane 19 which corresponds to the datum plane marked by the same reference numeral in Fig. 1 of the drawings. Only the first refractor 14 is shown in Fig. 2 of the drawings, which may be considered to be a relatively high velocity material such as a layer of limestone or the like. Interposed between the datum plane and the refractor 14 is a layer of lower velocity material 13 such as shale or the like.

In accordance with the present invention, the first step in the prospecting method comprises providing a plurality of seismic wave generating stations for seismic prospecting. In an actual set-up where an explosive such as dynamite is employed, a plurality of holes are drilled into which the dynamite may be placed. These holes will vary in depth in accordance with the particular terrain and the method of drilling these holes and the particular depth form no part of the present invention. In the idealized illustration in Fig. 2 of the drawings, the shot points are illustrated as points on the elevation datum plane designated by the reference characters I, II, III, IV, V, VI, VII, VIII, etc., and are arranged in a straight line. The distances between the shot points or generating stations will vary widely and in the arrangement illustrated, they may be considered to be of the order of 10,000 feet.

In order to record the reception of waves at various points spaced from the shot point or generating stations, a plurality of detector or geophone locations are illustrated in Fig. 2 also on the elevation datum 19. As illustrated, between the generating stations III and IV, a detector or geophone spread A is illustrated comprising geophone locations 1A, 2A, 3A, 4A and 5A, respectively. The geophone locations 1A and 5A correspond substantially with the shot point locations III and IV respectively as shown in Fig. 2, although it should be understood that this is by way of example only, since the spread of geophones for a certain shot point does not necessarily coincide with the distance between two shot holes, but is solely dependent on the best shooting distance of a certain refraction. A detector or geophone spread B comprising detector locations 1B, 2B, 3B, 4B and 5B is illustrated between shot point or generating stations IV and V. It should be noted that the detector location 1B is the same as the detector location 5A. Similarly, between the shot point stations V and VI there is provided a detector or geophone spread C comprising geophone locations designated as 1C to 5C respectively. Similar geophone spreads D and E are provided between shot point locations VI and VII and VII and VIII respectively. It will be understood that with a detector spread of 10,000 feet, such as is illustrated in Fig. 2 of the drawings, more than five detectors or geophones would be employed, only five being shown in Fig. 2 in order to simplify the drawings. Also, it will be understood that it may not be possible to obtain seismic wave recordings at all the locations in a particular spread with one set-up due to limitations in the recording apparatus employed. In addition, it will be understood that the information received at each of the geophone locations is supplied to a suitable recording apparatus whereby simultaneous records of the waves received at the various locations will be made.

In accordance with the present invention, the next step after the drilling of the shot holes comprises setting up the first spread of detectors. In order to take care of the general situation, the shot point stations may be designated as $n$, $n+1$, $n+2$, $n+3$, etc., where $n$ is any whole number representing one of said generating stations, $n+1$ is the next adjacent station in any direction and $n+2$ is the next adjacent station to $n+1$ going in the same direction as from station $n$ to station $n+1$. If the source of seismic waves is provided at the shot point station $n$ then the detectors for receiving the seismic waves are located between the generating stations $n+2$ and $n+3$. Referring to Fig. 2 of the drawings and assuming that the first seismic waves to be created in the geophysical prospecting method of the present invention are created at shot point station I, then the geophones are positioned between generating stations III and IV and designated as spread A. If an explosive charge is used to create the seismic waves, this explosive charge is detonated and the refracted waves are recorded at geophones 1A, 2A, 3A, 4A and 5A respectively. The trapezoidal trajectory of the waves of interest are illustrated by solid lines in Fig. 2 of the drawings and designated as S and $S_1$, $S_2$, $S_3$, $S_4$, and $S_5$, respectively. It will be noted that each refracted wave has two depth points, a first depth point R where the refracted wave strikes the interface of rock layer 14 and a second depth point $R_1$ to $R_5$ respectively where the waves are refracted at the interface to the particular geophone on the elevation datum.

In the event that the geophone set-up does not cover the entire spread A, additional shots will be fired from shot point station I and recordings made of the refracted waves S as received at the geophones spaced over the entire spread A. It should be noticed that in accordance with the present invention, a spread is chosen so that refracted waves are received at all of the geophone stations.

The next step in the seismic prospecting method of the present invention is to create seismic waves on the other side of spread A at a distance equal to the distance between shot point station I and spread A. Accordingly, seismic waves are created by any suitable means at generating station VI and these are received by the detectors or geophones in spread A for the identical locations which they had to receive the refracted waves from generating station I. The trapezoidal trajectories of the wave paths for this set-up are designated by the dashed lines S' and S'$_1$, S'$_2$, S'$_3$, S'$_4$ and S'$_5$. If the generating station I is considered the nth station, then the second shot is fired at station $n+5$. Following this, the geophones or detectors are moved from their locations in spread A to their locations in spread B with the geophone which was at station IA being moved to station 5A which is identical with station IB and the geophones which were positioned at stations 2A, 3A, 4A and 5A respectively being moved to locations 2B, 3B, 4B and 5B. With the detectors arranged in spread B seismic waves are created at station $n+1$ which is station II if $n$ is station I. The trajectories of the refracted waves generated at station II are designated by lines U and U$_1$, U$_2$, U$_3$, U$_4$ and U$_5$ respectively made up of long and short dashes. Following this, without moving the detectors or geophones, seismic waves are created at generating station $n+6$ or for the particular set-up illustrated at generating station VII. The trajectories of the refracted waves created at station VII and received by the geophones located in spread B are designated by the reference character U' and U'$_1$ to U'$_5$ respectively shown in dotted lines in Fig. 2 of the drawings. The geophones are then moved to spread C and seismic waves are created first at generating station III and then at generating station VIII, both sets of refracted waves being recorded by the geophones in their locations in spread C. Following each recording of refracted waves created at generating stations in line with but on either side of the spread the generating points and spread positions are moved a distance equal to the length of the spread. With this arrangement a plurality of records or seismograms are produced from which a continuous profile of the subsurface formation or contour of the subterranean bed can be obtained.

By creating seismic waves on either side of the spread and in line therewith, an accurate interpretation of the results may be obtained. If seismic waves were generated on only one side of the spread, the records might have more than a unique interpretation and to get such a unique interpretation, seismic waves are generated on either side of the spread with two recordings made corresponding to each geophone location.

It will be understood that if the depth point RI in Fig. 2, for example, is known, the relative positions of the adjacent depth points R2, R3, etc., can be calculated from the refraction times in a manner which is well understood by those skilled in the art. For the idealized set-up shown in Fig. 2, it will be apparent that the difference in time of receipt of the refracted wave S$_1$ at station IA with the receipt of the refracted wave S$_2$ at station 2A will equal the time required for the wave to travel from R1 to R2 in the high velocity layer 14 which travel is generally considered to be along the interface of layer 14. This time is usually referred to as the spread correction and is often designated by the expression $t_x$.

It will be understood that after the seismograms have been obtained in accordance with the prospecting method of the present invention described above, the traces on the refraction record are analyzed to apply the proper corrections for weathering and elevation. With the idealized set-up illustrated in Fig. 2 it will be understood that such corrections are already assumed to have been made. The time values as corrected are generally referred to as $t_c$. From this information then time-distance curves are plotted which for a level refractor such as 14, will have a predetermined slope dependent upon the spread between the geophones and the time the refracted wave takes to travel the additional distance along the refractor for succeeding geophone locations.

In Fig. 3, there is illustrated a time-distance curve for recording stations located a predetermined distance from two shot point stations for a situation where the refractor is not level. The portion of the time-distance curve F corresponds to the situation where the refractor is level with the datum plane such as is shown in Fig. 2 and the spread correction $t_x$ is equal to the time interval $\Delta t_c$ observed between adjacent stations. It should be noted that between geophone locations 1 and 2, an up-dip is indicated by curve G whereby the time interval $\Delta t_c$ is less than the spread correction $t_x$. Between geophone locations 3 and 4, on the other hand, a down-dip is illustrated and the curve H obtained thereby has a slope which differs from the curve F and from the curve G. The time interval $\Delta t_c$ in that case is greater than the spread correction $t_x$.

Figure 4A:
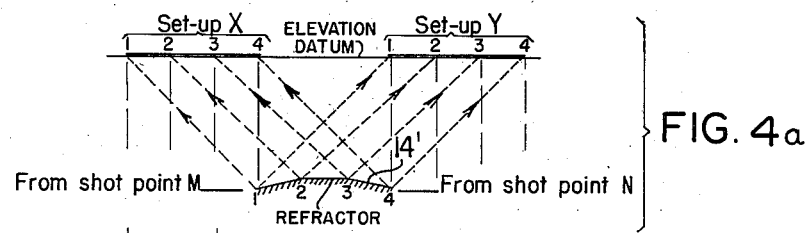
Fig. 4a illustrates a refraction cross-section for an idealized four station double set-up arrangement where the recording stations for the two set-ups are assumed to receive refracted energy from the same section of the refractor.
Figure 4B:
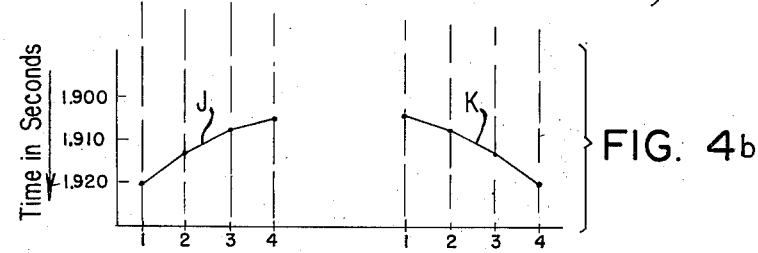
Figure 4C:
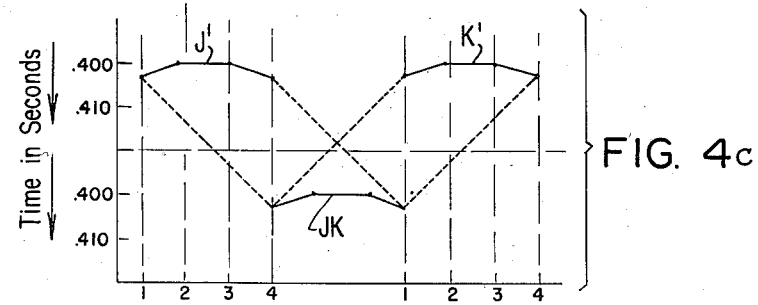
Figure 4D:
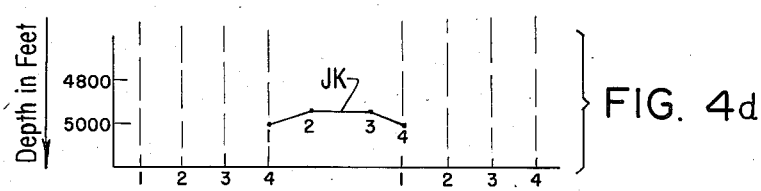

The practical application of the continuous profiling data obtained in accordance with the method described above and the construction of the refractor is illustrated in Figs. 4a, 4b, 4c and 4d of the drawings for an idealized four-station set-up with the refractor having a level portion between detector locations 2 and 3, an up-dip between detector locations 1 and 2, and a down-dip between detector locations 3 and 4 if observed from shot point M, corresponding substantially to the time-distance curve illustrated in Fig. 3. The recording stations of the two set-ups X and Y of Fig. 4a are assumed to receive refracted energy from the same section 1—2—3—4 of the refractor 14' of Fig. 4a. Set-up X which is a portion of a particular spread is recorded from shot hole N located towards the right while set-up Y is recorded from shot hole M located towards the left. The corrected time values $t_c$ are plotted as time-distance curves J and K below their respective recording stations as is shown in Fig. 4b of the drawings. It will be noted that the curve K is substantially like the curve in Fig. 3 of the drawings made up of sections G, F and H. The $\Delta t_c$ values can now be calculated and the spread correction $t_x$ applied to the $\Delta t_c$ values to construct the curves J' and K' shown at the top half of Fig. 4c of the drawings which are $\Delta t_1$ curves where $\Delta t_1 = \Delta t_c - t_x$. Assuming that the time-depth of a base station (for example, Depth Point No. 1 of the refractor) is already determined, successive $\Delta t_1$ values are applied to the time-depth value for Station No. 1, thus independently developing the $\Delta t_1$ curves for the two set-ups. Then the two $\Delta t_1$ curves are properly displaced to the original depth point location on the refractor as is clearly shown in the lower half of Fig. 4c. Since the $\Delta t_1$ curves do not always coincide because of inaccuracies inherent to the method applied, an average $\Delta t_1$ curve is constructed by averaging the two time values of the time refractor for each individual station which is illustrated by the curve JK in Fig. 4c of the drawings. The depth of the refractor is then readily constructed by converting the averaged time values of the time refractor into depth in feet by means of a time-depth conversion factor in a manner which is well understood by those skilled in the art. The depth curve JK obtained is shown in Fig. 4d of the drawings.

With the present invention directed to a new continuous profiling refraction method of seismic prospecting, an individual depth point is obtained for each geophone location whereby a profile of the subsurface stratum which is sufficiently accurate not only for reconnaissance purposes but for detailing is obtained. Further, this information is obtained by the present invention for areas where the reflection prospecting method is entirely unsatisfactory and yet the results are obtained in an economical manner both with regard to production and cost. Since the difference in depth from one point to another can be accurately determined and this process continued indefinitely, it is possible with the present method to obtain a complete profile of the surveyed subsurface rock bed and although the invention has been specifically illustrated with a single refractor, a plurality of refractors can be profiled from the results obtained by the seismic prospecting method of the present invention.

It will be understood by those skilled in the art that while there has been illustrated and described certain particular embodiments of the present invention, modifications thereof will occur to those skilled in the art. It should be understood, therefore, that the present invention will not be limited to the particular arrangements disclosed, and it is intended in the appended claim to cover all modifications and changes which fall within the true spirit and scope of the present invention.

I claim:

The method of determining the nature of subsurface geological structure in regions where there is at least one buried stratum of relatively high characteristic speed, which comprises establishing a predetermined spread of seismic wave detection points along a straight survey line, generating seismic waves adjacent the surface of the earth at a first wave generating point which is on said line with said spread on one side thereof and is spaced from said spread a predetermined distance which is several times greater than the distance at which waves generated at said first wave generating point and reflected from the interface between the high speed stratum and the overlying stratum may be detected at the earth's surface, recording the reception of the waves refracted upwardly from said interface to said plurality of detection points, thereby to obtain the differences in travel times of the waves from said wave generating point downward to said stratum, along the top of said stratum to a set of wave refraction points on said interface and upward to said detection points, generating seismic waves at a second wave generating point spaced a predetermined distance from said spread on the other side of said spread and located on said survey line, recording the reception of the waves generated at said second wave generating point and refracted upwardly from said interface to said plurality of detection points, thereby to obtain the differences in travel times of the waves from said second wave generating point to said stratum, along the top of said stratum to another set of wave refraction points on said interface and upward to said detection points, moving the entire detection point spread in one direction along said survey line a distance such that at least one of the detection points of the new spread position coincides with one of the detection points of the first spread position, repeating the described seismic wave generating steps on each side of said new spread position and on said survey line, recording the waves refracted from said interface to the detection points of the new spread position, thereby to obtain the differences in travel times of the waves from each of the new wave generating points downward to said stratum, along the top of the stratum to different displaced sets of wave refraction points and upward to the detection points of the new spread position, repeating the spread positioning, seismic wave generating and recording steps along said straight survey line in the manner described until waves have been refracted in each direction from each set of refraction points to the detection points of two displaced spread positions, and combining the differences in travel times of the waves refracted in each direction from each set of refraction points to the detection points of the two displaced spreads to determine the relative depths of the refraction points with the factor of wave travel time along the top of the subsurface stratum eliminated from said relative depth determinations.

ALBERT J. BARTHELMES.

REFERENCES CITED

The following references are of record in the file of this patent:

UNITED STATES PATENTS

| Number | Name | Date |
| --- | --- | --- |
| 1,782,445 | Rieber | Nov. 25, 1930 |
| 2,318,795 | Peters | May 11, 1943 |
| 2,321,450 | Athy | June 8, 1943 |
| 2,336,053 | Athy et al. | Dec. 7, 1943 |
| 2,348,411 | Petty | May 9, 1944 |